April 25, 1933.   P. S. FREESE   1,906,054

FRUIT JUICE EXTRACTOR

Filed April 22, 1930   3 Sheets-Sheet 1

INVENTOR
Paul S. Freese.
BY
Toulmin + Toulmin
ATTORNEYS

April 25, 1933.  P. S. FREESE  1,906,054
FRUIT JUICE EXTRACTOR
Filed April 22, 1930   3 Sheets-Sheet 2

INVENTOR
Paul S. Freese.
BY Toulmin + Toulmin
ATTORNEYS

April 25, 1933.  P. S. FREESE  1,906,054
FRUIT JUICE EXTRACTOR
Filed April 22, 1930   3 Sheets-Sheet 3

INVENTOR
Paul S. Freese.
BY Toulmin & Toulmin
ATTORNEYS

Patented Apr. 25, 1933

1,906,054

UNITED STATES PATENT OFFICE

PAUL S. FREESE, OF MARIETTA, OHIO, ASSIGNOR OF ONE-FOURTH TO IRA J. DODGE, OF MARIETTA, OHIO

FRUIT JUICE EXTRACTOR

Application filed April 22, 1930. Serial No. 446,384.

This invention relates to improvements in fruit juice extractors, and has for its object to provide a fruit juice extractor that is adapted to crush a single piece of fruit and extract the juice from the crushed fruit.

It is particularly the object of this invention to provide a juice extractor that is easily handled, light and small, and will occupy a minimum of space in a home or other place where it is adapted to be used.

It is also an object of this invention to provide a juice extractor embodied in one frame or casing, having therein a motor, a motor shaft, an extractor supported and operated by said shaft, and a crushing means located on the shaft and operated thereby adjacent the extracting means so that any fruit to be crushed may pass from the crusher directly into the extracting part of the apparatus, from which the juice flows by a convenient spout.

These and other advantages will appear from the description taken in connection with the drawings.

Referring to the drawings.

Figure 1:
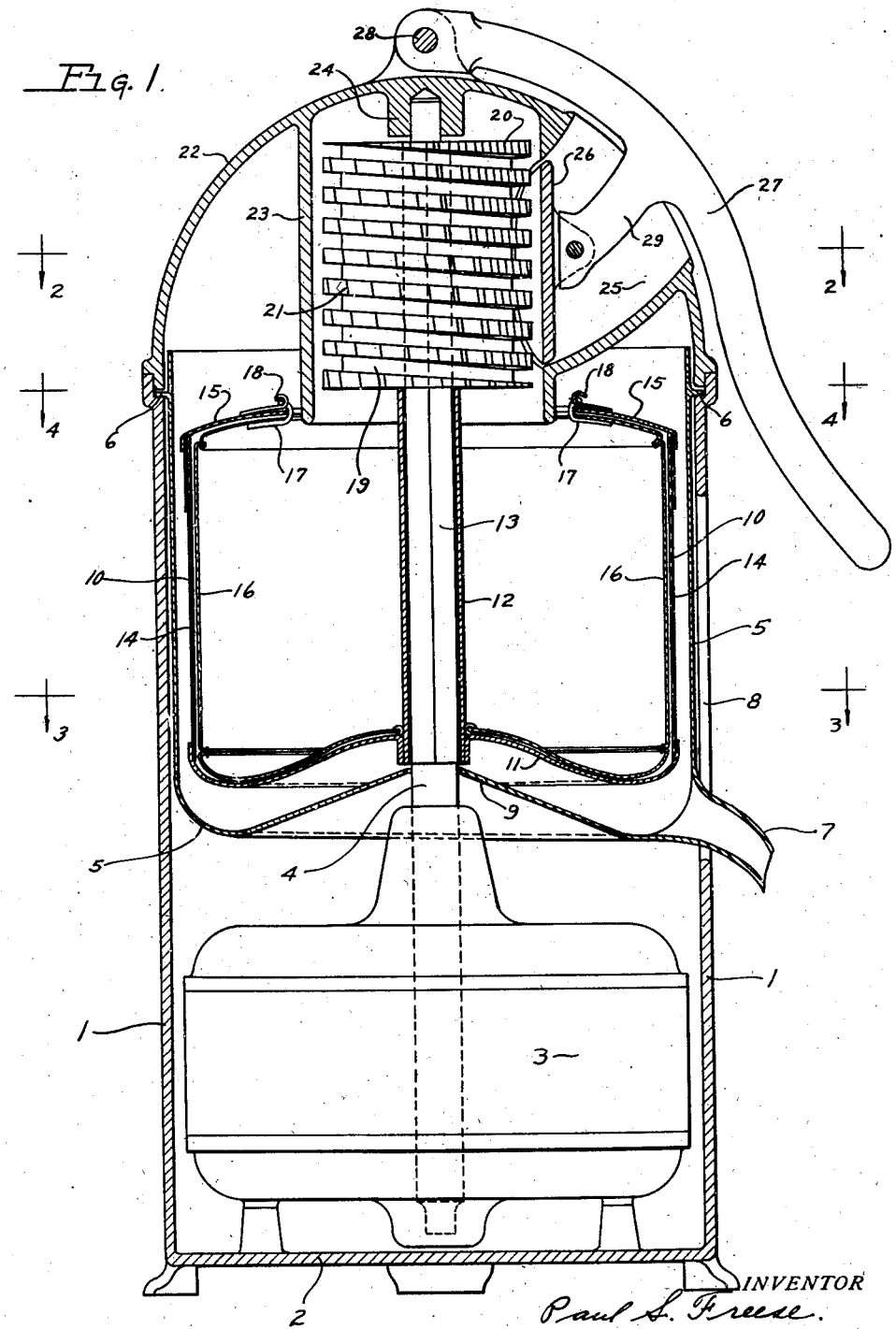
Figure 1 is a vertical section through the extractor showing all of the parts thereof.
Figure 2:
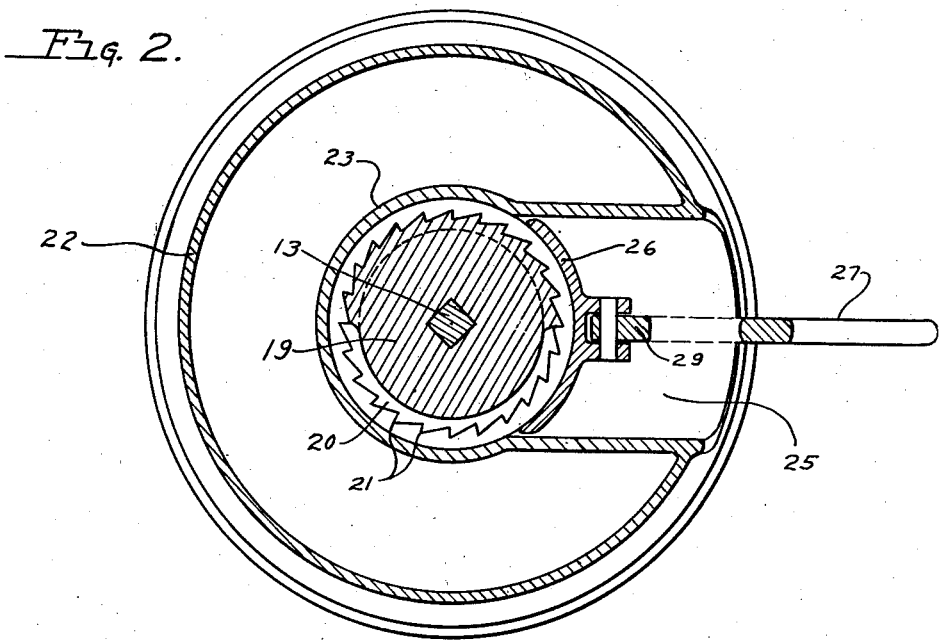
Figure 2 is a section on the line 2—2 of Figure 1.
Figure 3:
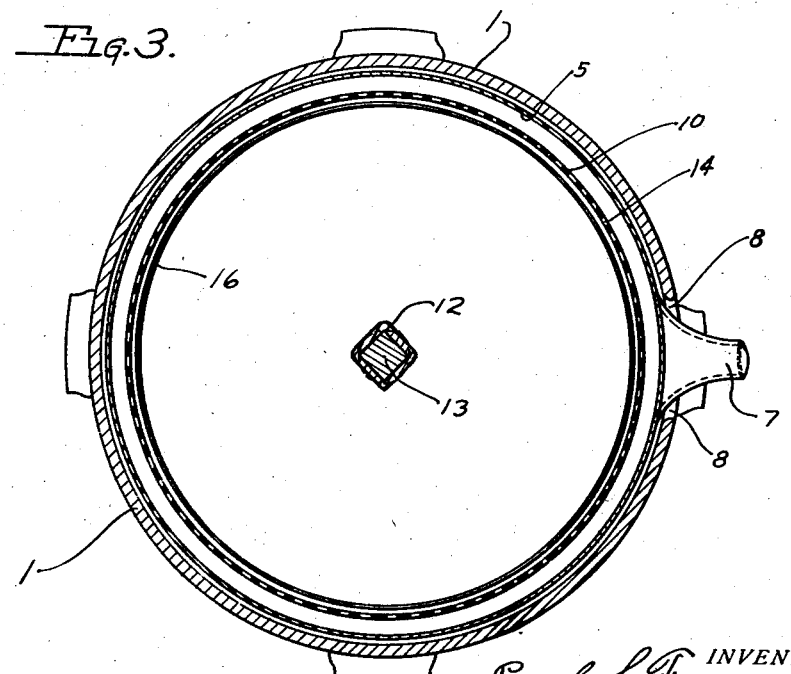
Figure 3 is a section on the line 3—3 of Figure 1.
Figure 4:
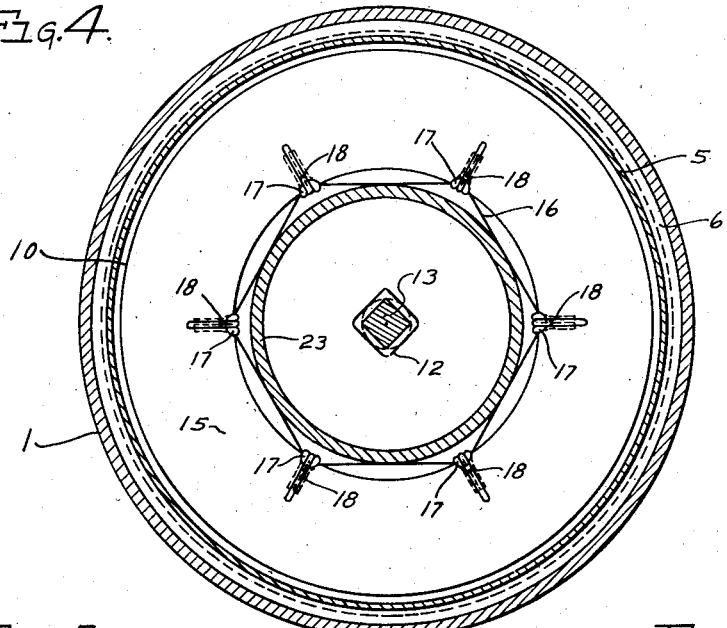
Figure 4 is a section on the line 4—4 of Figure 1.
Figure 5:
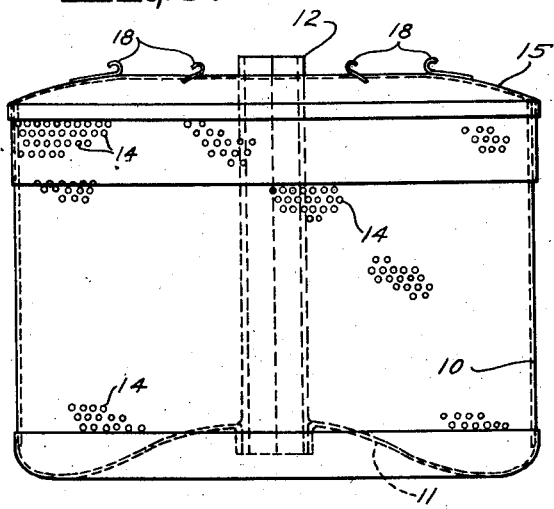
Figure 5 is a side elevation of the centrifugal basket.
Figure 6:
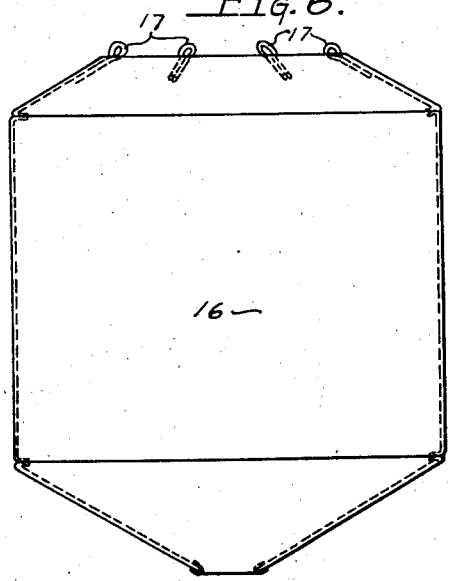
Figure 6 is a side elevation of a muslin bag adapted to be located within the centrifugal basket during the process of extraction.
Figure 7:
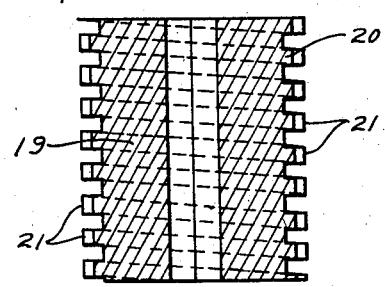
Figure 7 is a vertical, longitudinal section through the grinder.

Figure 1 shows a longitudinal vertical section through the entire apparatus, and shows every part thereof. All of the working parts are located within a housing 1, substantially cylindrical in shape, resting upon one closed end, while the other end is open. The bottom of the housing is indicated by the numeral 2 and supports thereon a motor 3, which has in the present instance a vertical motor shaft 4. This shaft extends entirely through the vertical length of the housing and beyond the top thereof.

Supported within the housing is a removable container 5, which has near the upper periphery thereof outwardly extending lugs 6, which rest upon the upper periphery of the housing and are supported thereby so that the container is supported in the upper end of the housing. Extending downwardly from the lower edge of one side of the container is a delivery spout 7 for discharging any fluid or liquid from the container. In order to permit the removal of the container and its spout 7 a slot 8 is provided in one side of the housing. The bottom of the container is convex in shape, as indicated by the numeral 9, and tends to divert the juice within the container from around the shaft and toward the spout 7. The container bottom 9 has a hole therein through which the motor shaft 4 extends and in which it rotates. The juice will not escape through the opening in the bottom of the container around the shaft because of the centrifugal force, due to the rapid rotation of the shaft and the fruit-containing basket.

Within the container is a centrifugal basket 10, which has strainer walls for the purpose of retaining the fleshy parts of the fruit but permitting the juice to pass through and to be caught in the container and discharged through the spout 7. The bottom of the basket is indicated by the numeral 11 and is substantially the same shape as the bottom of the container, but has a hole therethrough somewhat larger than the hole through the bottom of the container, with flared edges to receive the lower end of a sleeve 12 and to which the sleeve is attached. The sleeve extends from the bottom of the container substantially to the top of the housing, and is square in shape to accommodate the squared part 13 of the motor shaft 4 at this point. The motor shaft is square for the purpose of causing the strainer to rotate with the shaft as it rotates, due to the operation of the motor.

The peripheral perforations in the walls of the strainer basket are indicated by the numeral 14. This basket is composed of sheet metal and maintains its shape during the process of separation as it rotates around with the motor shaft. The top of this basket, indicated by the numeral 15, partly closes the basket but leaves a circular opening therein to receive the lower end of a casing, later to be described. Within the centrifugal basket or strainer is a muslin bag 16. This bag is substantially the same shape as the centrifugal basket, or assumes substantially the same shape when the basket is rotated with the bag therein.

The upper end of this bag is open in the central part thereof, similar to the centrifugal basket, and has a series of loops 17 adapted to engage hooks 18 on the edge of the central opening in the top 15. By this means the muslin bag is held in place within the centrifugal basket even though the basket is not rotating. Near the upper end of the motor shaft is a grinder 19, circular in shape, and has extending around it a spiral thread-like member 20, as shown in Figure 1. This thread-like member has teeth 21 therein, somewhat in the shape of a right angle triangle, or like saw teeth having one vertical edge and one inclined edge. These teeth, as the grinder rotates, cut the fruit into minute particles for extracting the juice therefrom.

For the purpose of closing the upper end of the housing there is provided a dome-shaped, removable lid or cover 22, the periphery of which rests upon the periphery of the upper end of the housing. Extending downwardly from the central part of the lid or cover is a cylindrical casing 23, which incloses the grinder 19 and projects within the opening in the top 15 of the centrifugal basket so that whenever the crusher is operating the crushed fruit will drop therefrom into the centrifugal basket, where the juice is separated from it.

The upper end of the motor shaft 4 is supported in a bearing 24 in the central part of the dome-shaped cover. For the purpose of feeding fruit to the crusher there is provided a passageway 25 extending from the outer wall of the cover, through one wall of the casing 23. This passageway is more or less circular in shape and is well adapted to receive one piece of fruit, such as an apple, pear or other similar fruit which is to be crushed and have the juice extracted therefrom.

In order that the fruit may be pressed against the grinder there is provided a pusher 26. This pusher is a plate having substantially the general shape of the passageway 25 and curved to correspond to the curvature of the walls of the casing 23 so that whenever this pusher is pushed its full extent it forms a part of the continuous wall of the casing. For the purpose of operating the pusher there is provided a handle 27 pivoted at 28 on top of the cover. Extending from the handle 27 is an arm 29 pivoted to the outside wall of the pusher.

Whenever it is desired to crush a piece of fruit the handle 27 is raised so that the pusher 26 is withdrawn from the passageway. At this time an apple, or such other fruit as may be desired, may be placed within the passageway. Due to the natural slope of the passageway the apple will roll against the grinder, but in order to hold the apple against the grinder and force its complete maceration the pusher is placed against the apple and operated by the handle 27. When one apple is entirely macerated or ground to pieces another one may be placed in the passageway and the operation repeated.

In an apparatus of this kind the juice may be extracted from an apple, or other fruit, as desired and in the quantity desired. This is not only advantageous in that you can extract the necessary amount of juice as and when you need it, but this apparatus is effective in that it extracts from the fruit substantially the whole of the juice thereof. This is effected in the first place by the complete maceration of the fruit, due to the particular structure of the grinder and to the rapid rotation of the centrifugal basket.

It will be observed that the grinder is composed of a continuous thread extending from one end of the grinder to the other, and that this thread has arranged thereon cutting teeth. The rotation of the grinder, having a thread-like structure thereon, tends not only to thoroughly grind and mash the fruit to pieces but to work it down toward the bottom of the casing so that the crushed fruit will fall into the muslin bag 16, supported within the centrifugal basket 10.

All of these parts are operated by the motor 3. In the present instance the motor is shown connected directly to the shaft that operates all of the parts. The rotation of the motor rotates the grinder and at the same time rotates the bag and basket for the purpose of separating the juice from the crushed fruit. This apparatus is small, may be easily carried from place to place in the hand, and may be used for producing the juice from one apple or as many apples as may be desired for one particular using.

The fruit is crushed by means of the crusher and the casing 23. The rotation of the crusher tends to work the crushed fruit down so that it will fall within the bag 16 supported by the centrifugal basket. The rotation of the basket tends to throw the crushed fruit toward the outer wall thereof, and at the same time eject the juice from the fruit through the apertures in the walls of the rotating basket. The juice is collected within the container 5.

The bottom of this container is convex in shape so that the juice tends to move from the area of the shaft and the sleeve surrounding the shaft, so that no juice will pass through the connections between the shaft, the strainer, the basket and the sleeve. After the juice has been removd from the crushed fruit and collected in the bottom of the container it passes out through a spout and can be caught in a suitable vessel for that purpose. In order that the juice may be properly drained that part of the bottom of the container adjacent the spout may be somewhat lower than the other parts of the bottom. The vertical slot in the housing permits the removal of the container. This slot is provided for the spout 7.

In order to remove the refuse from the basket the top can be removed, after which the grinder is removed from the upper end of the shaft. After this is done the parts 10 and 16 may be lifted from the shaft and the refuse dumped, after which the parts may be assembled as shown in Figure 1.

While this apparatus is shown of a size adapted for use in connection with only one apple, or other fruit, it may be made large enough to receive and grind several apples at one time, the quantity and number of the apples depending upon the size of the inlet passageway, as well as the size of the apparatus as a whole.

I desire to comprehend within my invention such modifications as may be clearly embraced within my claims and the scope of my invention.

Having thus fully described my invention, what I claim is new and desire to secure by Letters Patent, is:

1. In a fruit juice extractor, in combination, a fruit crusher consisting of a casing and a cylindrical grinder in the casing, and a rotatable perforated container supported beneath the crusher and adapted to rotate at a high rate of speed so that the juice is extracted from the crushed fruit.

2. In a fruit juice extractor, a casing having an inlet passageway, a cylindrical grinder in said casing, means in said passageway to force fruit into said casing against the grinder, a centrifugal basket positioned to receive crushed fruit from said casing, and a common means for rotating the grinder and the basket.

3. In a fruit juice extractor, a housing, a centrifugal juice extractor in said housing, a cover for said housing, and a fruit crusher in said cover for crushing fruit and discharging it into the juice extractor.

4. In a fruit juice extractor, a housing, a cover for said housing, a rotatable shaft in said housing and cover, a centrifugal juice extractor in said housing operated by said shaft, and a fruit crusher in said cover operated by said shaft for crushing and discharging fruit into the juice extractor.

5. In a fruit juice extractor, a vertical shaft, means for rotating said shaft, a centrifugal juice extractor supported by said shaft for rotation therewith, and a fruit crushing means consisting of a casing and a cylindrical grinder in the casing on said shaft operated by the shaft and having means to discharge the crushed fruit into the juice extractor.

6. In a fruit juice extractor, a housing, a motor in said housing having a shaft, a juice extractor in said housing supported by said shaft for rotation therewith, a cover for said housing, and a fruit crusher in said cover operated by said shaft for crushing and delivering fruit into the juice extractor.

7. In a fruit juice extractor, a housing, a motor in said housing having a shaft, a juice extractor in said housing supported and operated by said shaft, a cover for said housing, and a fruit crusher in said cover, said fruit crusher including a casing formed on the cover and a grinder supported on and rotated by said shaft.

8. In a fruit juice extractor, a housing, a motor in said housing having a shaft, a juice extractor in said housing supported and operated by said shaft, a cover for said housing, a fruit crusher in said cover, said fruit crusher including a casing formed on the cover and a grinder supported on and rotated by said shaft, and means on the cover for delivering fruit to the crusher.

9. In a fruit crusher, a housing, a container in said housing, a cover for said housing, a casing in said cover, said cover and casing having a passageway leading into the container, a grinder in said casing cooperating therewith to crush and deliver fruit to the container, and means in the passageway to feed fruit to the grinder.

10. In a fruit crusher, a housing, a shaft supported at one end in said housing, a container in said housing, a cover for said housing supporting the other end of said shaft, a casing in said cover surrounding the end of the shaft in the cover, a grinder on said shaft in said casing and cooperating with the casing to crush and deliver fruit to the container, and means to deliver fruit to the casing.

11. In a fruit crusher, a housing, a shaft supported at one end in said housing, a container in said housing, a cover for said housing supporting the other end of said shaft, a casing integral with said cover surrounding the end of the shaft in the cover, said casing and cover having a passageway leading into the casing, a grinder on said shaft in said casing and cooperating therewith to crush and deliver fruit to the container, and means in the passageway to deliver fruit to the casing to be crushed.

12. A machine for extracting the juice of fruit, comprising a stationary housing, a shaft rotatably mounted in said housing, a strainer mounted on said shaft for rotation therewith, a container inclosing said strainer, and means located on top of said housing for crushing fruit and discharging it into the strainer.

13. A machine for extracting juice from fruits, comprising a stationary housing, a container within said housing, a shaft rotatably mounted in said housing and extending through said container, a strainer mounted on said shaft within said container for rotation with the shaft, a bag supported in said strainer, and means for crushing and discharging fruit into the bag, said means consisting of a grinder on the shaft and a casing supported by the housing.

14. A machine for extracting juice from fruits, comprising a stationary housing, a container within said housing, a shaft rotatably mounted in said housing and extending through said container, a strainer mounted on said shaft within said container for rotation with the shaft, a bag supported in said strainer, means for crushing and discharging fruit into the bag, said means consisting of a grinder on the shaft and a casing supported by the housing, and means for rotating the shaft.

15. A machine for extracting juice from fruits, comprising a stationary housing, a vertical shaft rotatably mounted in said housing, the upper part of said shaft being square, a sleeve having a square hole therethrough removably supported on said shaft, a strainer basket supported on said shaft, a strainer basket supported on the lower end of said sleeve, a grinder having a square hole therein removably fitting over the upper end of said shaft and resting on said sleeve, and a removable cover for said housing, said cover having a casing inclosing said grinder and forming therewith a fruit crusher.

16. A machine for extracting juice from fruit, comprising a stationary housing, a removable cover for said housing, a casing integral with said cover, said casing and cover having a passageway into the casing for fruit, a vertical shaft supported by said housing and cover for rotation, a centrifugal basket removably supported by said shaft for rotation therewith in said housing, and a grinding means located in the casing and removably supported by said shaft for rotation therewith.

17. In a fruit juice extractor, a stationary housing, a removable cover for said housing, a rotatable shaft supported at one end by the housing and at the other end by the cover, the upper part of said shaft being angular, a centrifugal basket removably supported by the angular part of the shaft, a removable top for the basket, a removable bag supported in the basket by the top, and a grinder removably supported on the angular part of the shaft adjacent the basket.

18. In a fruit juice extractor, means for simultaneously crushing fruit and causing it to move downward, said means including a rotatable crusher having thereon a spiral thread with teeth, a rotatable strainer means for catching the ground fruit as it leaves the grinding means, a common shaft means to rotate the strainer to separate the juice from the fruit and to rotate the crusher, and a stationary means for receiving the juice from the strainer means and discharging it.

19. In a fruit juice extractor, means to crush fruit, a strainer basket to receive the fruit from the crushing means, and a shaft for supporting and rotating the crushing means and the strainer basket, said basket having a convex bottom with a central hole therein to receive the shaft, whereby the juice will be drawn away from the shaft both by the shape of the strainer basket bottom and the rotation of the strainer basket.

In testimony whereof, I affix my signature.

PAUL S. FREESE.